Jan. 30, 1951       H. ECKHARDT       2,539,534
SAFETY COUPLING DEVICE
Filed Nov. 23, 1949

INVENTOR.
HENRY ECKHARDT
BY Hudson & Young
ATTORNEYS

Patented Jan. 30, 1951

2,539,534

UNITED STATES PATENT OFFICE

2,539,534

SAFETY COUPLING DEVICE

Henry Eckhardt, Bayside, N. Y., assignor to Phillips Petroleum Company, a corporation of Delaware Application November 23, 1949, Serial No. 129,050

7 Claims. (Cl. 318—473)

This invention relates to safety coupling devices. In one aspect, it relates to a device for coupling a driving member to a driven member in such a way that the connection is broken by excessive overloading of the driving mechanism. In another aspect, it relates to an automatic clutching device for breaking the connection between a driving member and a driven member which is responsive to sudden overloads on the driven equipment or to excessive heat build-up in the driving equipment.

In coupling a driven mechanism to a driving mechanism, it is usually desirable to have some means for breaking the driving connection if the driven mechanism becomes overloaded to the point that damage will result to the driving mechanism. This is especially true in the case of an electric motor. One method of doing this is to use an overload switch on the motor. This is ordinarily done by making the overload switch responsive to heat build-up in the motor so that the motor is shut off when it reaches a certain predetermined temperature. However, these devices are usually operated so that when the motor cools, it starts again. When the driving mechanism is jammed in such a way that it cannot be started until the trouble is corrected, the motor is continually starting and stopping as it becomes cooled and heats up again. This can result in damage to the motor.

Other devices, such as shear pins, have been employed in the coupling to permit the connection to be broken by excessive overloads. However, these pins must be strong enough to withstand the sudden shock of starting the equipment from a standstill and a steady overload may not be necessary to break the connection.

I have invented a device for coupling a driving member to a driven member which is responsive to sudden excessive overloads and to steady overloads which cause dangerous overheating of the driving equipment. My invention is so designed that a sudden excessive overload on the driving connection or a gradual overload which causes heat to build up in the motor breaks the driving connection by melting a fusible material which joins the driving member to the driven member. When the connection is broken, my device shuts off the motor so that it must be reset before the machine is placed in operation again. However, my safety coupling does not have to be repaired when the connection is broken, but it automatically reconnects itself as it cools.

My invention will be more clearly understood from the following drawings, detailed description, and claims.

Figure 1:
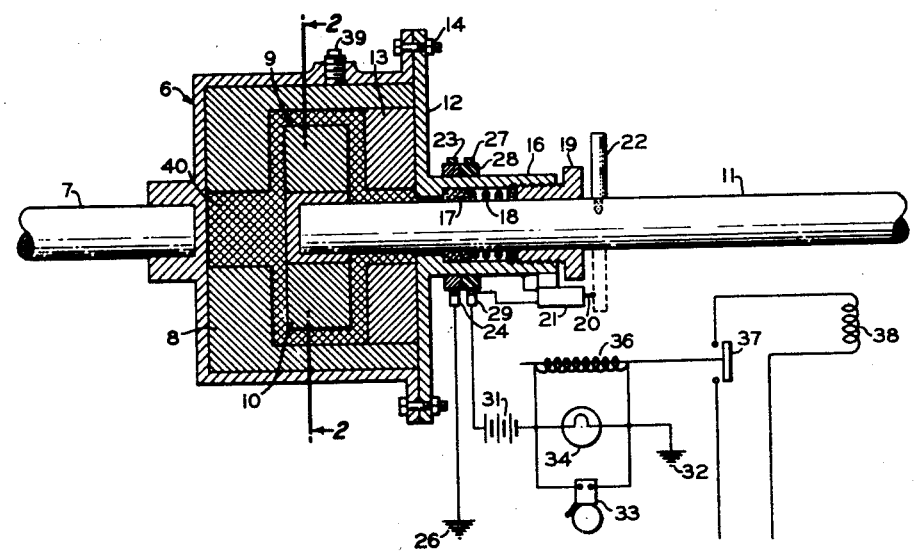
Figure 1 is a longitudinal sectional view of one modification of my coupling device showing the arrangement for shutting off the motor when the driving connection is broken.

In Figure 1, housing 6, which is rigidly secured to shaft 7, has a plurality of vanes 8 extending interiorly into said housing. Rotatably positioned within housing 6 is an impeller 9 which is secured to shaft 11. End closure member 12, which closes the open end of housing 6, has vanes 13 extending interiorly into said housing and is secured to said housing by means of bolts 14. Shaft 11 passes through an axial opening in closure member 12 and the annular space around shaft 11 is sealed by means of stuffing box 16 which contains packing 17, spring 18, and gland 19. The automatic shut-off device includes a toggle switch 21 which is fastened onto the side of stuffing box 16 and a projection 22 on shaft 11, which is so positioned that it will strike the button 20 of toggle switch 21 when said shaft is rotated with respect to the housing. One pole of the toggle switch is connected to the housing which is grounded by means of a slip ring 23, brush 24, and ground 26. The other pole of the toggle switch is connected to a slip ring 27 which is rotatable with the housing, but is insulated by means of non-conducting ring 28. Brush 29 rides on slip ring 27 and is connected to battery 31 which is grounded at 32. Connected between battery 31 and ground 32 are bell 33, light 34, and relay 36 which operates switch 37 to break the electrical connection between motor winding 38 and the source of power, not shown. Plug 39 in housing 6 closes an opening which is provided for filling said housing with a heat-responsive material 40. Shafts 7 and 11 are provided with thrust bearings (not shown) to prevent engagement of the vanes secured to the housing 8 and 13 with those of impeller 9. While these bearings are preferably outside the portion shown in Figure 1, they may be located inside housing 6.

Figure 2:
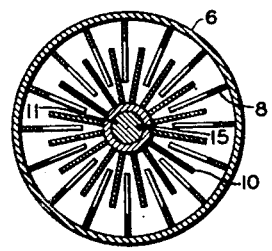
Figure 2 is a cross-sectional view of Figure 1 taken along the line 2—2'.

Figure 2, which is a cross-sectional view of the coupling shown in Figure 1, shows the housing 6, housing vanes 8, and vanes 10 of impeller 9. Impeller 9 is secured to shaft 11 by means of key 15.

Figure 3:
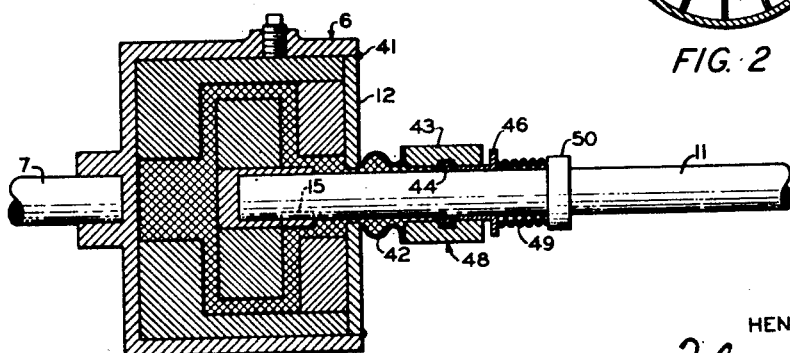
Figure 3 is a longitudinal sectional view of another modification of my coupling.

Figure 3 shows a modification of the Figure 1 device wherein end closure member 12 is secured to housing 6 by weld 41, and in which the closure around shaft 11 is of a modified type. This closure comprises a bellows 42 through which shaft 11 passes. One end of said bellows is secured to closure member 12 and the opposite end is secured to a collar 43 which is slidable on shaft 11. A seal is provided by means of an O-ring 44 and gland 46. The entire assembly forms a slidable stuffing box 48 which is biased toward the housing by means of spring 49 and collar 50, which is rotatably, but not slidably, secured to shaft 11.

The invention will be more clearly understood from the following detailed description of its operation. The inwardly-projecting vanes 8 and 13 of housing 6 are so arranged that impeller 9 is rotatable within said housing without any contact between the vanes of the impeller and the vanes of the housing. The space within housing 6 and around impeller 9 is filled with a low-melting material which is solid at ordinary temperatures and which has a fusion point above the temperature attained by the device in normal operation. This heat-responsive material has a fusion point below the temperature at which substantial damage will result to the driving mechanism. This is determined by the temperature to which it is permissible to heat the particular driving mechanism. This coupling device should be located near the driving mechanism so that heat which builds up in said mechanism is readily transmitted to the coupling. The distance of the coupling device from the driving mechanism must be considered in selecting the heat-responsive material to be used in the coupling since sufficient heat must be transmitted to the coupling to melt this material before the motor is heated to the point that it is substantially damaged.

Since some motors are designed to operate at higher temperatures than others, and since the heat transfer from the motor to the coupling will depend on the distance between the two and the amount of external cooling, the specific heat-responsive material to be used must be selected according to the conditions under which each device must operate.

To set up the device for operation, the impeller is rotated to a position such that member 22 is out of contact with toggle switch 21 and said switch is set in the off position. Plug 21 is removed and the desired heat-responsive material is poured as a liquid into the housing to fill the space within said housing. The plug is then replaced and the material in said housing is allowed to solidify. Switch 37 is normally in the closed position and is opened only when toggle switch 21 is turned to the on position. During normal operation, shafts 7 and 11 and housing 6 rotate together. If the heat responsive material filling housing 6 is heated to its fusion point so that it permits rotation of shaft 11 with respect to housing 6, member 22 strikes the button of toggle switch 21 to turn it to the on position. This causes current to flow through the alarm system to ring bell 33, light up incandescent light 34 and actuate relay 36 which opens switch 37 and shuts off the motor.

If the heat-responsive material is melted, the molten liquid is maintained within the sealed housing so that to place the coupling back into operation merely requires cooling the material so that it becomes solid again.

Should the driving mechanism become suddenly jammed to throw an excessive overload on the motor, the impeller 9 will shear the solidified heat-responsive material and become free to rotate. Since not more than one complete revolution of shaft 11 with shaft 7 is required to shut off the power to the motor, there is little possibility of serious damage to any of the equipment. The vanes on the impeller and within the housing are of such size and are so positioned that the solid heat-responsive material can be sheared by the impeller blades without serious damage to the coupling.

Since less than one complete revolution of impeller 9 with respect to housing 6 is required to shut off the motor, the hydraulic clutching action of the coupling is not important. However, if the automatic shut-off is not to be employed, the size of the vanes in the coupling should be small enough that there will ordinarily be a minimum of torque on shaft 11 when the heat-responsive material is in the liquid state. The vanes should be of such size that the amount of power required to rotate the impeller even if the housing is at a standstill would be no greater than the motor could safely produce without overheating. The automatic shut-off is comparatively simple in operation and construction, and it is generally preferred to use one in connection with my coupling.

One advantage of my invention is that the driving mechanism connection between shafts 7 and 11 can be restored without making any repairs or changes in the coupling. It is a distinct advantage to have the automatic shut-off. The mechanism will run indefinitely if normal operating conditions are maintained, but if the driving connection is broken, either by shearing or by melting, the equipment should be shut off until the condition which caused the broken connection is corrected. When the driving connection has been restored by solidification of the molten material in the housing, the toggle switch 21 is set in the off position and the equipment is ready to be started again.

While in my drawings I have shown a coupling with a considerable number of vanes, it is not necessary or ordinarily desirable that there be this many. It is only necessary that there be a sufficient number so that the stress on the vanes is maintained at a safe value. Under some circumstances, two or three vanes on the impeller and the same number in the housing is sufficient. The housing and impeller may be secured to their respective shafts by any desired means. I have shown them as being keyed on, but they may be bolted or welded or even swaged as long as the connection is rigid. End closure member 12 may be secured to housing 6 by any well-known means, such as welding or bolting.

While either the impeller or the housing may be the driving member, it is generally preferable that it be the impeller because the transfer of heat to the heat-responsive material is better accomplished through shaft 11.

Examples of materials which are useful for the heat-responsive substance are:

| Material | Fusion Point, °C. |
|---|---|
| Naphthalene | 80.2 |
| Sulfur | 110–120 |
| Bismuth alloys | 65.5–111 |
| Tin alloys | 145–320 |
| Lead alloys | 238–327 |

Numerous other alloys or materials may be used as long as the conditions are met with respect to the fusion point. Alloys of almost any desired fusion point may be prepared.

If the coupling shown in Figure 3 is used, collar 50 should be rotatable about shaft 11 so that spring 49 will not be damaged by rotation of the impeller with respect to the housing. Collar 53 can very conveniently be a roller bearing.

Having described my invention, I claim:

1. A safety coupling device connecting a driving member and a driven member designed to prevent overloading of the driving equipment which comprises a closed housing secured to one of said members and having a plurality of interior projections, an impeller secured to the other of said members and rotatably and concentrically positioned within said housing, a solid heat-responsive material filling the space within said housing and around said impeller whereby rotation of said driving member with respect to said driven member is prevented, said material having a softening point below the temperature at which substantial damage is done to the driving equipment but above the temperature attained by said material during normal operation of the equipment.

2. A safety coupling connecting a driving member to a driven member and designed to protect a driving means from excessive overloads which comprises, in combination, a closed housing rigidly secured to one of said members, said housing having a plurality of vanes projecting inwardly into the interior thereof, an impeller rigidly secured to the other of said members and being concentrically positioned within said housing but having no contact with the vanes thereof, a solid, heat-responsive material filling the space within said housing and around said impeller to form a rigid connection between said driving and said driven members, said material having a softening point below the temperature at which damage results to the driving means but above the temperature attained by said material in normal operation of said equipment.

3. A safety coupling connecting a driving member to a driven member and designed to protect the driving means from excessive overloads which comprises, in combination, a closed housing rigidly secured to one of said members, said housing having a plurality of vanes projecting inwardly into the interior thereof, an impeller rigidly secured to the other of said members and being concentrically positioned within said housing but having no contact with the vanes thereof, a solid, heat-responsive material filling the space within said housing and around said impeller to form a rigid connection between said driving and said driven members, said material having a softening point below the temperature at which damage results to the driving equipment but above the temperature attained by said material in normal operation of said equipment, and means for maintaining said heat-responsive material in place when it is in the liquid state.

4. A safety coupling connecting a driving member to a driven member and designed to protect the driving means from excessive overloads which comprises, in combination, a closed housing rigidly secured to one of said members, said housing having a plurality of vanes projecting inwardly into the interior thereof, an impeller rigidly secured to the other of said members and being concentrically positioned within said housing but having no contact with the vanes thereof, a solid, a heat-responsive material filling the space within said housing and around said impeller to form a rigid connection between said driving and said driven member, said material having a softening point below the temperature at which damage results to the driving equipment but above the temperature attained by said material in normal operation of said equipment, means for filling said housing with molten heat-responsive material, and means for maintaining the heat-responsive material in place within said housing when said material is liquid so that on cooling, said driven member is non-rotatably secured to said driving member.

5. A safety coupling connecting a driven member to a driving member and designed to protect the driving means from excessive overloads which comprises, in combination, a closed housing rigidly secured to one of said members, said housing having a plurality of vanes projecting inwardly into the interior thereof, an impeller rigidly secured to the other of said members and being concentrically positioned within said housing but having no contact with the vanes thereof, a solid, a heat-responsive material filling the space within said housing and around said impeller to form a rigid connection between said driving member and said driven member, said material having a softening point below the temperature at which damage results to the driving means but above the temperature attained by said material in normal operation of said equipment, means for filling said housing with molten heat-responsive material, and means for maintaining the heat-responsive material in place within said housing when said material melts so that on cooling, the connection between said driven member and said driving member is made rigid, comprising a stuffing box around the impeller shaft, packing, a packing gland having a spring between said packing and said packing gland for maintaining uniform pressure on said packing.

6. A safety coupling connecting a driving member to a driven member and designed to protect the driving means from excessive overloads which comprises, in combination, a closed housing rigidly secured to one of said members, said housing having a plurality of vanes projecting inwardly into the interior thereof, an impeller rigidly secured to the other of said members and being concentrically positioned within said housing but having no contact with the vanes thereof, a solid, heat-responsive material filling the space within said housing and around said impeller to form a non-rotatable connection between said driving member and said driven member, said material having a softening point below the temperature at which damage results to the driving means but above the temperature attained by said material in normal operation of said equipment, means for filling said housing with molten heat-responsive material, and means for maintaining the heat-responsive material in place within said housing when said material melts so that on cooling, said driven member is non-rotatably secured to said driving member comprising a bellows axially disposed around the impeller shaft having one end secured to said housing and the opposite rotatably sealed to said shaft, and a helical spring biased against the free end of said bellows to maintain uniform pressure on the heat-responsive material within said housing.

7. A safety clutch connecting a driving member to a driven member and designed to protect the driving means from excessive overloads which comprises, in combination, a closed housing rigidly secured to one of said members, said housing having a plurality of vanes projecting inwardly into the interior thereof, an impeller rigidly secured to the other of said members and being concentrically positioned within said housing but having no contact with the vanes thereof, a solid, a heat-responsive material filling the space within said housing and around said impeller to form a non-rotatable connection between said driving member and said driven member, said material having a softening point below the temperature at which damage results to the driving equipment but above the temperature attained by said material in normal operation of said equipment, means for giving a signal when the driving connection is broken, and means to shut off said driving means when the driving connection is broken.

HENRY ECKHARDT.

REFERENCES CITED

The following references are of record in the file of this patent:

UNITED STATES PATENTS

| Number | Name | Date |
|---|---|---|
| 2,124,965 | Lind | July 26, 1938 |
| 2,140,723 | Spicer | Dec. 20, 1938 |
| 2,224,440 | Lewis | Dec. 10, 1940 |
| 2,314,227 | Lieberherr | Mar. 16, 1943 |

FOREIGN PATENTS

| Number | Country | Date |
|---|---|---|
| 510,000 | Germany | Of 1930 |